(12) United States Patent
Talbot

(10) Patent No.: US 6,206,452 B1
(45) Date of Patent: Mar. 27, 2001

(54) VEHICLE

(75) Inventor: Kevin Trevor Talbot, Lichfield (GB)

(73) Assignee: Rover Group Limited, Warwick (GB)

( * ) Notice: Subject to any disclaimer, the term of this patent is extended or adjusted under 35 U.S.C. 154(b) by 0 days.

(21) Appl. No.: 09/365,004

(22) Filed: Aug. 2, 1999

(30) Foreign Application Priority Data

Aug. 5, 1998 (GB) .................................................. 9816918

(51) Int. Cl.⁷ ......................................................... B60J 1/08
(52) U.S. Cl. ..................... 296/146.1; 296/68.1; 232/201; 180/273
(58) Field of Search ............................... 296/68.1, 146.1; 292/201; 180/273; 70/264; 340/426

(56) References Cited

U.S. PATENT DOCUMENTS

| 4,805,723 | * | 2/1989 | Aoki et al. | 180/273 |
| 5,092,638 | | 3/1992 | Mizuki | 292/216 |
| 5,232,243 | * | 8/1993 | Blackburh et al. | 180/273 |
| 5,474,327 | | 12/1995 | Schousek | 280/735 |
| 5,618,056 | * | 4/1997 | Schoos et al. | 180/273 |
| 5,780,397 | * | 7/1998 | Kong | 340/426 |
| 5,864,295 | * | 1/1999 | Jarocha | 180/273 |
| 6,020,812 | * | 2/2000 | Thompson et al. | 180/273 |
| 6,024,378 | * | 2/2000 | Fu | 180/273 |
| 6,040,532 | * | 3/2000 | Munch | 180/273 |
| 6,056,079 | * | 5/2000 | Cech et al. | 180/273 |
| 6,058,341 | * | 5/2000 | Myers et al. | 180/273 |
| 6,069,325 | * | 5/2000 | Aoki | 180/273 |
| 6,081,757 | * | 6/2000 | Breed et al. | 180/273 |
| 6,087,598 | * | 7/2000 | Munch et al. | 180/273 |

FOREIGN PATENT DOCUMENTS 2 260 361   4/1993   (GB) .

* cited by examiner

Primary Examiner—Joseph D. Pape
Assistant Examiner—Kiran B. Patel
(74) Attorney, Agent, or Firm—Davis & Bujold, P.L.L.C.

(57) ABSTRACT

A vehicle 10 is disclosed having an automatic child lock function that is controlled by an electronic control unit 4. The electronic control unit 4 receives signals from weight sensors 23a, 23b, 23c in the base portion of each of the passenger seats 22. The findings from the sensors 23a, 23b, 23c are used to determine both the occupancy of the vehicle 10 and to produce a signal indicative of the weight of each of the passengers of the vehicle 10. The electronic control unit 4 is programmed to operate such that if the signal "W" received from a particular sensor 23a, 23b, 23c indicates that the passenger is below a predetermined weight "WC", which indicates that the passenger is probably a child, the associated door 14, 16, 17 is prevented from being opened from a closed position even when an interior door handle 14b, 16b, 17b is operated by the passenger.

10 Claims, 4 Drawing Sheets

VEHICLE

FIELD OF THE INVENTION

This invention relates to vehicles and in particular to a vehicle having a door securing system.

BACKGROUND OF THE INVENTION

It is well known to provide a vehicle with means to releasably secure one or more doors of the vehicle in a closed position and means in the form of interior and exterior door handles to allow the doors to be released from said closed position to permit entry or egress from the vehicle.

It is further known to provide a blocking means to secure at least the rear doors of the vehicle in a semi-locked state so that actuation of the interior door handle will not release the door from its closed position. Such blocking means are often referred to as "child locks", as they are frequently used to prevent children from opening the rear doors while the vehicle is in motion.

SUMMARY OF THE INVENTION

It is an object of this invention to provide an improved vehicle.

According to the invention there is provided a vehicle having a body defining a passenger compartment with at least one passenger door, a passenger seating means, and a door securing system, the door securing system comprising a control means which is arranged in use to receive and send signals, an occupancy sensing means to make a finding regarding a weight of a passenger who may be seated upon said seating means and to send a signal indicative of that finding to said control means, an internal door release means associated with said door, a latch means for said door to selectively secure said door in a closed position and being operable to release said door from said closed position when said internal door release means is operated, wherein, when said occupancy sensing means makes a finding that said weight is below a predetermined weight limit, said control means is arranged to disable said internal door release means in such a manner that said door cannot be released from said closed position by operation of said internal door release means. Said seating means may be positioned substantially adjacent to said passenger door.

Said seating means may include a base part upon which a said passenger sits when using said vehicle and said occupancy sensing means may comprise a weight sensor which is located in said base part. Said weight sensor may comprise a load sensor, pressure pad or pressure sensor, which may be connected to said control means.

Said vehicle may further comprise a power supply to said latch means, which power supply is associated with said internal door release means in such a manner that said internal door release means can be disabled by interruption of said power supply.

Said control means may be arranged to selectively send a door release signal to said latch means such that said internal door release means can be disabled by prevention of a sending of said door release signal.

Said door may have an electrically controlled door locking means to selectively secure said door in said closed position irrespective of an operation of said internal door release means.

Said vehicle may further comprise a user operable control which can be used to disable operation of weight sensitive latching of said door.

Said vehicle may further comprise a user operable control which can be used to change said predetermined weight limit. The change may only be temporary.

Said door securing system may further comprise an external door release means, wherein said latch means is operable to release said door from said closed position when said external door release means is operated, even if said internal door release means has been disabled.

BRIEF DESCRIPTION OF THE DRAWINGS

Preferred embodiments of the invention will now be described by way of example only and with reference to the accompanying drawings, in which.

DESCRIPTION OF PREFERRED EMBODIMENTS OF THE INVENTION

Figure 1:
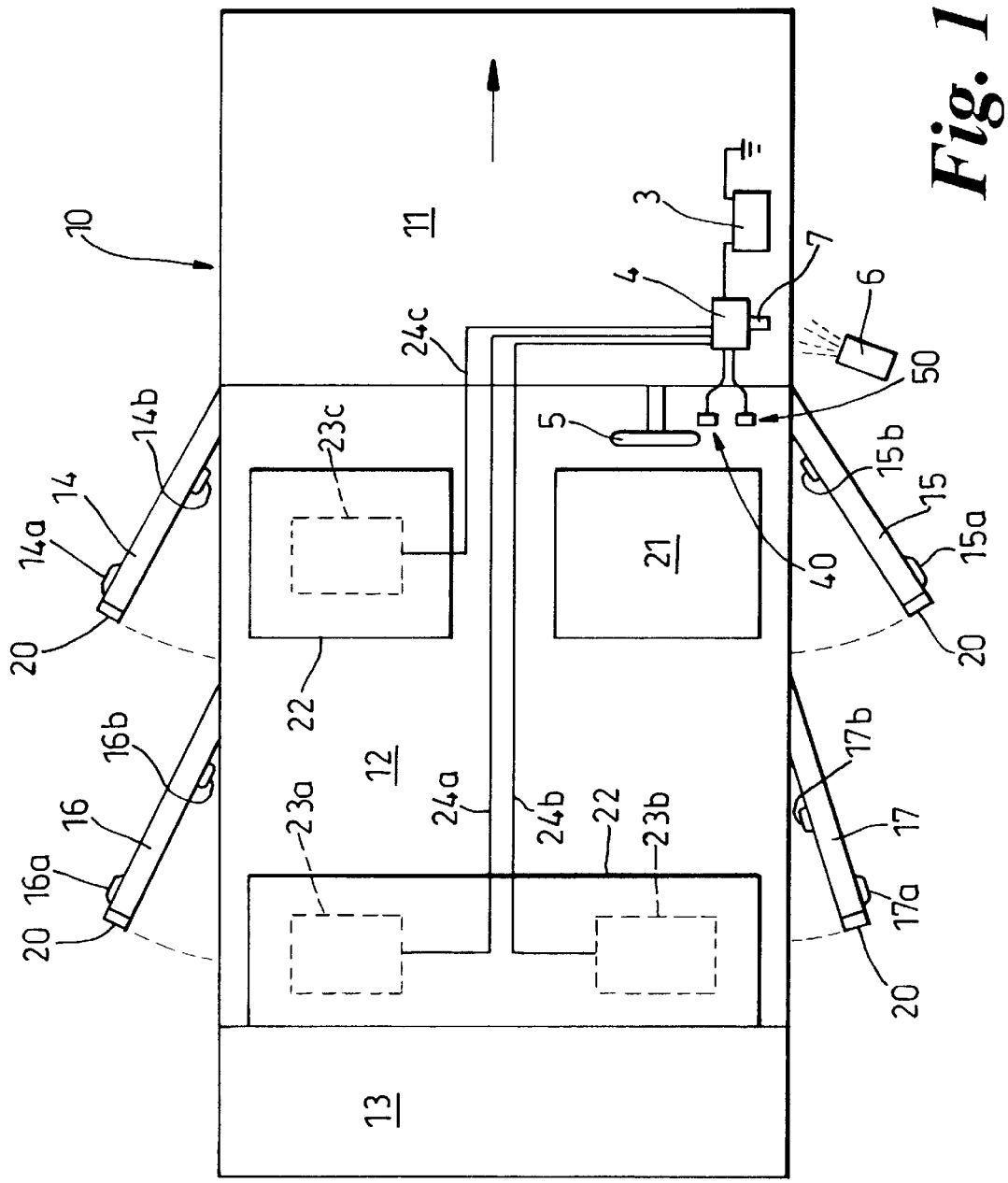
FIG. 1 is a schematic plan view of a vehicle according to the invention.
Figure 2:
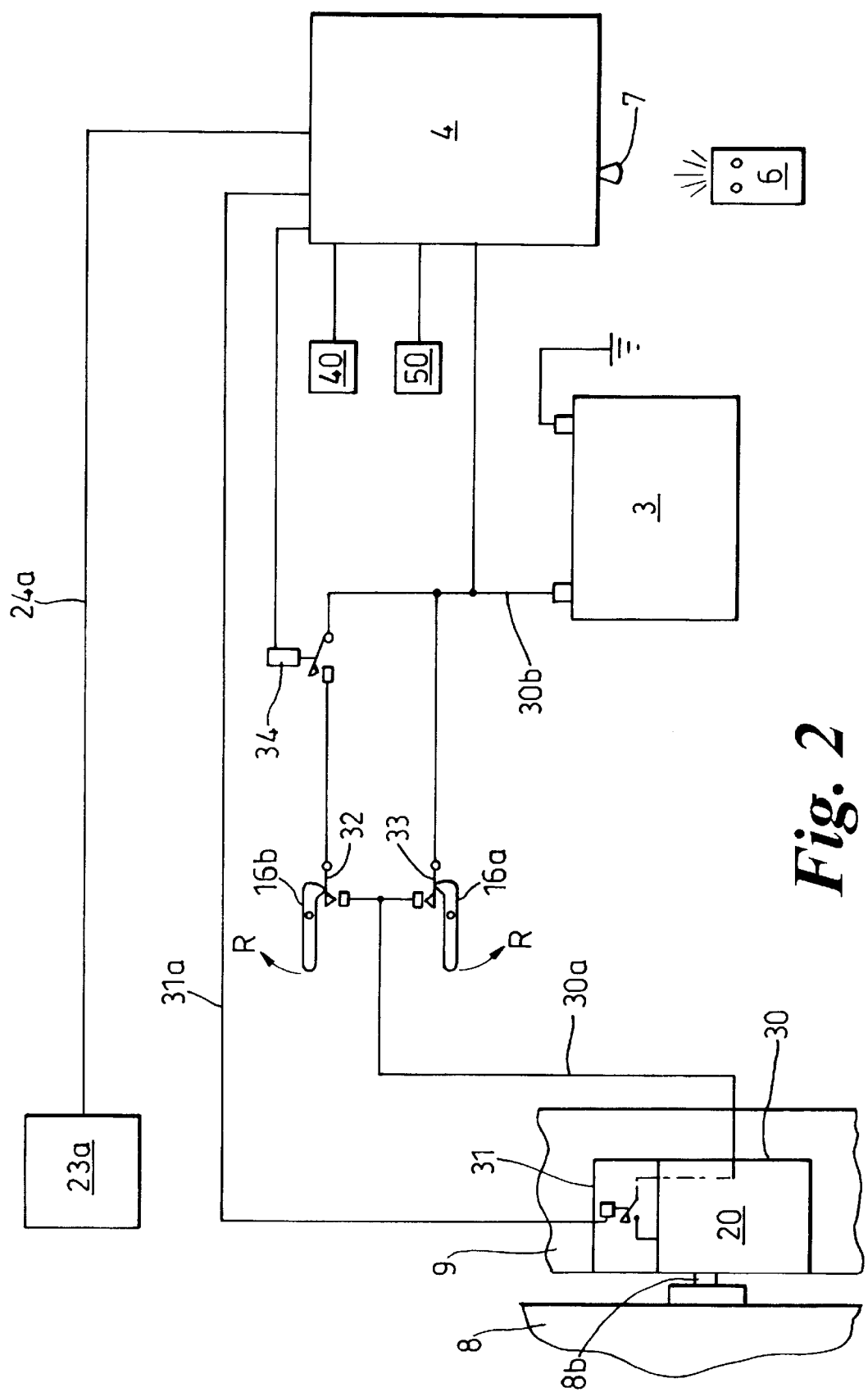
FIG. 2 is a schematic representation of part of a door securing system forming part of a vehicle according to a first embodiment of the invention.

With particular reference to FIGS. 1 and 2, there is shown a (right-hand-drive) vehicle 10 having a body structure defining an engine compartment 11, a passenger compartment 12 and a luggage compartment 13. The vehicle has a user's seat 21, a number of passenger seats 22 and a steering wheel 5.

Four doors 14, 15, 16, 17 are provided to allow access to the passenger compartment 12. Each of the doors 14, 15, 16, 17 has an external door release means in the form of an exterior door handle 14a, 15a, 16a and 17a and an internal door release means in the form of an interior door handle 14b, 15b, 16b and 17b.

A door securing means 20 is attached to part of the door structure 9 of each of the doors 14, 15, 16, 17. The door securing means 20 includes a door latch means 30 and a door lock means 31.

The function of the door latch means 30 is to hold the respective door 14, 15, 16, 17 in a closed position by co-operating with a latching pin 8b fixed to the body structure 8 defining the door surround.

Each of the passenger seats 22 is fitted in its base portion with an occupancy sensing means for measuring the load (i.e. weight) placed upon the seat 22 and is in the form of a weight sensor, which in this embodiment comprises respective pressure sensors 23a, 23b, 23c. The weight sensors could also take the form of load sensors or pressure pads.

The sensors 23a, 23b, 23c are arranged to provide a finding, in the form of a weight signal, to an electronic control unit 4 via a respective one of the occupancy sensor input leads 24a, 24b, 24c. The finding is indicative of the load or weight placed upon the seat 22 with which the sensor 23a, 23b, 23c is associated.

The sensors 23a, 23b, 23c form an occupancy sensing means to sense the position and weight of any or each of the passengers who may be seated within the passenger compartment, or at least of those passengers who may be seated substantially adjacent to one of the passenger doors 14, 16, 17.

The electronic control unit 4 checks the findings/weight signals received from the sensors 23a, 23b, 23c to determine whether a seat 22 is occupied and, if it is, to determine the likely kind of occupant of the seat 22 by comparing the signal received "W" with a reference signal "WC", which comprises a predetermined weight limit which is indicative of the maximum expected weight of a child.

The electronic control unit 4 receives a source of electric power from a battery 3 and further inputs from three user operable devices 6, 40, 50. The first of these user operable devices is a radio frequency transmitter 6 which is arranged to communicate with a receiver 7 connected to the electronic control unit 4 in order to provide a signal indicating whether the doors 14, 15, 16, 17 should be locked into a closed position or unlocked so as to allow the door to be moved from said closed position. Such devices are well known and it is usual that the transmitter 6 sends a coded signal to the receiver 7 for security reasons.

The electronic control unit 4 is connected to the door lock means 31 by a lead 31a and is operable in response to the signal received from the transmitter 6 to enable or disable the door lock means 31. As shown in FIG. 2, the door lock means 31 is in the form of a relay which is "made" to disable the door lock means 31 and "broken" to enable the door lock means 31. When the door lock means 31 is enabled, all of the doors 14, 15, 16, 17 are locked and actuation of any of the handles 14a, 14b, 15a, 15b, 16a, 16b, 17a, 17b will not release the doors 14, 15, 16, 17 because the circuit via the door lock means 31 is broken.

The second user operable control is in the form of a child lock control switch 40, which is used to switch on or off the automatic passenger sensing child lock function (i.e. weight sensitive door latching). When the switch 40 is in an "on" position, the electronic control unit 4 will send no signal to a relay 34 if the finding/signal received from the pressure sensor 23a indicates that the load or weight on the respective seat 22 is less than "WC" and so in this state the associated circuit through the relay 34 is broken (as shown in FIG. 2).

In this state, actuation of the exterior door handle 16a in the direction of the arrow "R" will close the microswitch 33 and current will flow from the battery 3 along the leads 30b and 30a to energise the door release member 30 and thereby unlatch the respective door 16 provided that the locking member 31 is not enabled.

Actuation of the interior door handle 16b in the direction of arrow "R", however, will close the microswitch 32 but this will have no effect because the relay 34 is broken. In this way the interior door handle 16b is unable to release the passenger door 16 with which it is associated.

If, however, the load sensed to be present on the associated seat 22 is greater than "WC", then the electronic control unit 4 will actuate the relay 34 and make the associated circuit. In this state, operation of the interior door handle 16b in the direction of arrow "R" will close the microswitch 32 and a circuit from the battery 3 to the door latch means 30 will be made by via the leads 30a, 30b, because the relay 34 is closed.

When the child lock switch 40 is in an "off" position, the electronic control unit 4 will send a signal to the relay 34 irrespective of the signal received from the pressure sensor 23a and so operation of either of the door handles 16a, or 16b will cause the door 16 to be unlatched from its secured position. In this way, the automatic passenger sensing child lock function is disabled.

The third user operable control is in the form of a child lock sensitivity switch 50 which is used to change the value of "WC" used to govern operation of the automatic child lock function. This allows the automatic child lock function/weight sensitive door latching to be customised in accordance with the preferences of the user.

For example, by increasing "WC" to a very large value, the child lock function can be continuously engaged so that any passenger sitting in one of the passenger seats is unable to open the adjacent door until the child lock switch 40 is switched off or the exterior handle 16a is operated.

This function is useful if, for example, an elderly passenger is carried in the vehicle who is not able to judge when it is safe to open the adjacent passenger door. Alternatively, by reducing "WC" to a lower value, it is possible to discriminate between passengers of different weight so that, for example, the reference value "WC" could be set such that the weight of a younger child will actuate the automatic child lock function but the weight of an older child will not actuate the automatic child lock function. Therefore, irrespective of where the two children sit within the vehicle 10, the door 14, 16, 17 adjacent to the younger child will, so long as the switch 40 is in the "on" position, have the child lock automatically engaged. The door 14, 16, 17 adjacent to the older child, however, will not be automatically locked and so can be opened from the inside of the vehicle 10.

It will be appreciated that FIG. 2 shows only the circuit for one of the passenger doors of the vehicle and that this circuit would be replicated for all of the other passenger doors 14, 16, 17.

Figure 3:
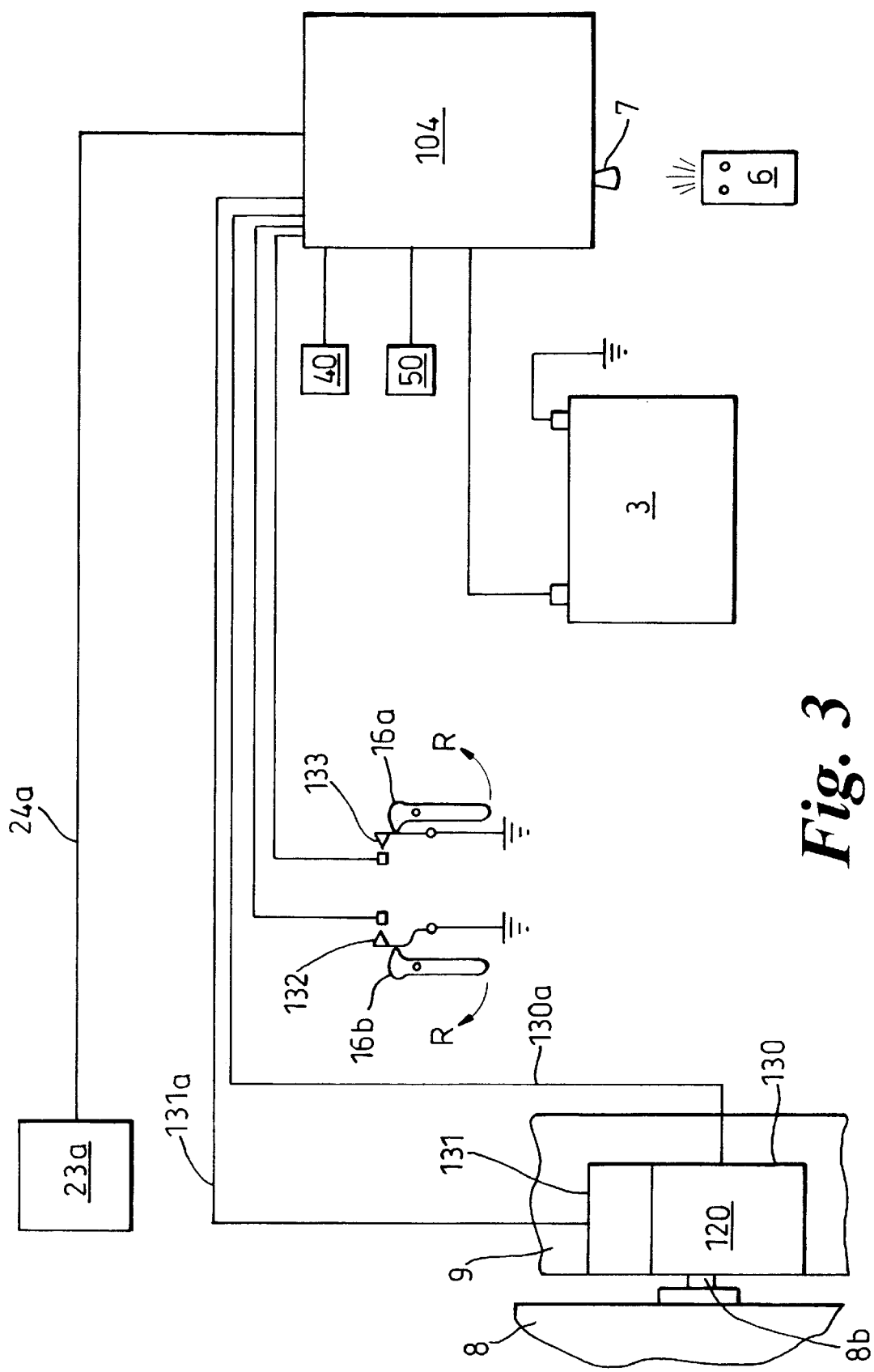
FIG. 3 is a schematic representation of part of a door securing system forming part of a vehicle according to a second embodiment of the invention.

Referring now to FIG. 3, there is shown a second embodiment of a door securing system which is in many respects similar to that previously described with respect to FIG. 2 and once again only the circuit for one passenger door is shown.

However, unlike the previously described system, the microswitches associated with the door handles 16a, 16b do not directly control operation of the door latch means 130 but merely provide binary signals to the electronic control unit 104. These binary signals act as door release signals which are used by the electronic control unit 4 to selectively release the door latch means 130. The electronic control unit 104 controls the securing means 120 via two control leads 130a, 131a which are connected to the latch means 130 and to the locking means 131.

Figure 4:
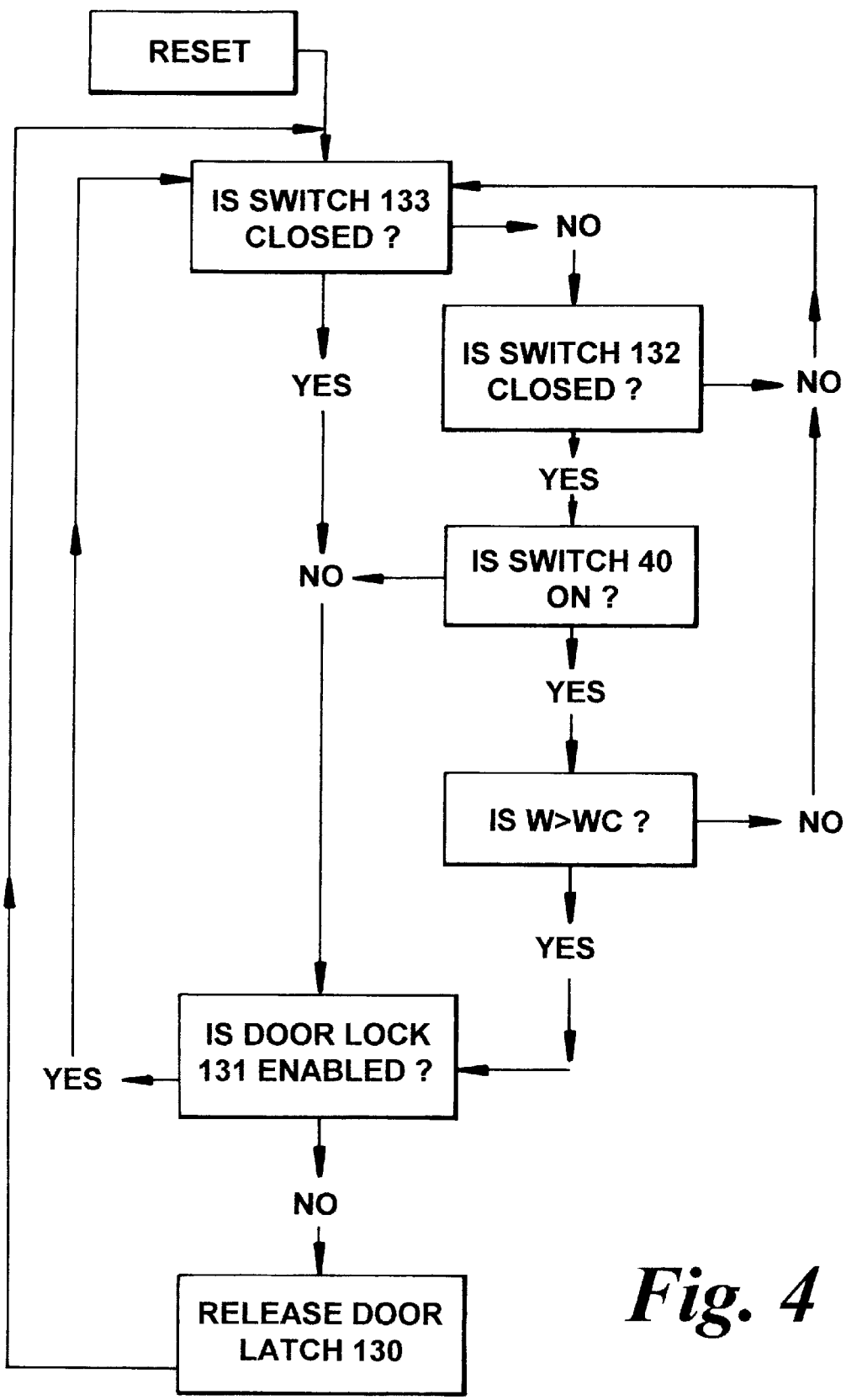
FIG. 4 is a simplified flow chart showing the operation of the door securing system according to said second embodiment of the invention.

Operation is as previously described and can be better understood by reference to FIG. 4.

The electronic control unit 104 firstly determines whether the switch 133 associated with the exterior door handle 16a is closed. If the switch 133 is closed then the electronic control unit 104 checks whether the transmitter 6 has enabled the lock member 131.

If the lock member 131 has been enabled then the door will not be released and the electronic control unit 104 re-starts the cycle. However, if the lock member 131 has not been enabled, then the door latch 130 is released.

If switch 133 is not closed, the electronic control unit 104 checks whether the switch 132 is closed and, if it is not, it re-starts the cycle. However, if the switch 132 is determined to be closed then the electronic control unit 104 determines whether the child lock switch 40 is on. If the child lock switch 40 is not in the "on" position, the electronic control unit 104 checks whether the door lock means 131 is enabled and, if the door lock means 131 is enabled, the electronic control unit 104 re-starts the cycle. If, however, the door lock means 131 is not enabled, it 104 releases the door latch 130.

However, if the child lock switch 40 is in the "on" position then the automatic child lock is engaged and the electronic control unit 104 compares the signal it is receiving from the pressure sensor 23 a with the value of "WC" as being sent by the sensitivity control 50. If the perceived load "W" is equal to or greater than the comparator signal "WC", then the electronic control unit 104 is operable to check whether the door lock member 131 is enabled and then as before it then either releases or does not release the door latch member 130. However, if the perceived weight "W" is less than the control value "WC", then the cycle is re-started without allowing the door latch means 130 to be released by the interior door handle 16b.

It will be appreciated by the man skilled in the art that the door handles 14a, 14b, 15a, 15b, 16a, 16b, 17a, 17b could be replaced by any other input device such as a push button or key pad and that other means such as infra-red sensors could be used to sense the presence of an occupant.

It will further be appreciated that the invention is not limited to the use of a radio frequency transmitter to lock the vehicle, other forms of door locking such as a key operated switch could be effectively employed.

The use of the term "child lock" merely refers to disabling of the interior door handles during certain circumstances so that a passenger within the passenger compartment cannot exit the vehicle through a passenger door which has been so disabled. In such a state, even if the interior door handle is moved it will not result in the associated passenger door from being released from its closed position.

What is claimed is:

1. A vehicle having a body defining a passenger compartment with at least one passenger door, a passenger seating means, and a door securing system, the door securing system comprising a control means which is arranged in use to receive and send signals, an occupancy sensing means to make a finding regarding a weight of a passenger who may be seated upon said seating means and to send a signal indicative of that finding to said control means, an internal door release means associated with said door, a latch means for said door to selectively secure said door in a closed position and being operable to release said door from said closed position when said internal door release means is operated, wherein, when said occupancy sensing means makes a finding that said weight is below a predetermined weight limit, said control means is arranged to disable said internal door release means in such a manner that said door cannot be released from said closed position by operation of said internal door release means.

2. A vehicle as claimed in claim 1, wherein said seating means is positioned substantially adjacent to said door.

3. A vehicle as claimed in claim 1, wherein said seating means includes a base part upon which a said passenger sits when using said vehicle and said occupancy sensing means comprises a weight sensor which is located in said base part.

4. A vehicle as claimed in claim 3, wherein said weight sensor comprises a load sensor, pressure pad or pressure sensor.

5. A vehicle as claimed in claim 1, wherein said vehicle further comprises a power supply to said latch means, which power supply is associated with said internal door release means in such a manner that said internal door release means can be disabled by interruption of said power supply.

6. A vehicle as claimed in claim 1, wherein said control means is arranged to selectively send a door release signal to said latch means such that said internal door release means can be disabled by prevention of a sending of said door release signal.

7. A vehicle as claimed in claim 1, wherein said door has an electrically controlled door locking means to selectively secure said door in said closed position irrespective of an operation of said internal door release means.

8. A vehicle as claimed in claim 1, further comprising a user operable control which can be used to disable operation of weight sensitive latching of said door.

9. A vehicle as claimed in claim 1, further comprising a user operable control which can be used to change said predetermined weight limit.

10. A vehicle as claimed in claim 1, said door securing system further comprising an external door release means, wherein said latch means is operable to release said door from said closed position when said external door release means is operated, even if said internal door release means has been disabled.

* * * * *